US012665743B2

(12) United States Patent
Carr et al.

(10) Patent No.: US 12,665,743 B2
(45) Date of Patent: Jun. 23, 2026

(54) SYSTEMS AND METHODS FOR SECURE MULTI-PARTY COMPUTATION PROTOCOL EXECUTION USING CHECK POINTS

(71) Applicant: Enveil, Inc., Fulton, MD (US)

(72) Inventors: Ryan Carr, Fulton, MD (US); Jeffery Hein, Glen Burnie, MD (US); Claire Tomesch, Baltimore, MD (US)

(73) Assignee: Enveil, Inc., Fulton, MD (US)

( * ) Notice: Subject to any disclaimer, the term of this patent is extended or adjusted under 35 U.S.C. 154(b) by 343 days.

(21) Appl. No.: 18/242,692

(22) Filed: Sep. 6, 2023

(65) Prior Publication Data

US 2025/0080328 A1     Mar. 6, 2025

(51) Int. Cl.
| | |
|---|---|
| *H04L 9/06* | (2006.01) |
| *H04L 9/08* | (2006.01) |
| *G06F 11/14* | (2006.01) |
| *H04L 9/32* | (2006.01) |

(52) U.S. Cl.
CPC .......... H04L 9/0631 (2013.01); H04L 9/0825 (2013.01); H04L 9/0866 (2013.01); H04L 9/0894 (2013.01); G06F 11/1407 (2013.01); G06F 11/1438 (2013.01); H04L 9/3242 (2013.01)

(58) Field of Classification Search
CPC ....... H04L 9/08; H04L 9/0825; H04L 9/0866; H04L 9/0894; H04L 9/085; H04L 9/0861; H04L 9/06; H04L 9/0631; H04L 9/32; H04L 9/3242; H04L 9/30; G06F 11/1407; G06F 11/1438
See application file for complete search history.

(56) References Cited

U.S. PATENT DOCUMENTS

| | | | | | |
|---|---|---|---|---|---|
| 11,080,131 | B2 * | 8/2021 | Schwartz | .............. | G06F 9/5027 |
| 2008/0256138 | A1 * | 10/2008 | Sim-Tang | ........... | G06F 16/1873 |
| 2018/0095812 | A1 * | 4/2018 | Deutsch | .................... | H04L 9/14 |
| 2020/0226284 | A1 * | 7/2020 | Yin | ..................... | G06F 21/6254 |
| 2020/0401408 | A1 * | 12/2020 | Burky | ................... | G06F 9/3863 |
| 2022/0121521 | A1 * | 4/2022 | Eldefrawy | .............. | H04L 9/085 |

* cited by examiner

*Primary Examiner* — Shaqueal D Wade-Wright
(74) *Attorney, Agent, or Firm* — Carr & Ferrell LLP; Myrna M. Schelling

(57) ABSTRACT

An encryption system and method are provided that provide the ability to execute a secure multi-party computation (SMPC) protocol to compute a large function using check points. At each checkpoint, respective parties to the computation write out some encrypted data that can be used to initiate the next stage of the computation between the present check point and the next check point. In this manner, if any participating party experiences a failure, such as a network outage, system crash, disk corruption, etc., during the protocol execution, there is no need to re-start the entire protocol from scratch. This allows for large functions to be practically computed using SMPC.

20 Claims, 8 Drawing Sheets

100

300

302

102-C 106          108          104-C

Party 1
Storage

Party 1
Process

Party 2
Process

Party 2
Storage

New Circuit Execution
State: $((key_0, stage_0)$,
STARTED)

New Circuit Execution
State:
<Compulation State>

$key_0$,
... <Party 1 input
for stage 1>

<Party 2 input
for stage 1>

Party 1 Input | Party 2 Input

SMPC Protocol that:
-Executes the first stage of
the compulation, producing
intermediate output using the
chosen encryption scheme and
Party 1's key, producing
$E(output_0, key_0)$ Party 1 Output | Party 2 Output Update Circuit Execution
State:
$((key_0, stage_0)$, DONE)

DONE

120

$E(output_0, key_0)$

Update Circuit Execution
State:
<Compulation State>
$E(output_0, key_0)$

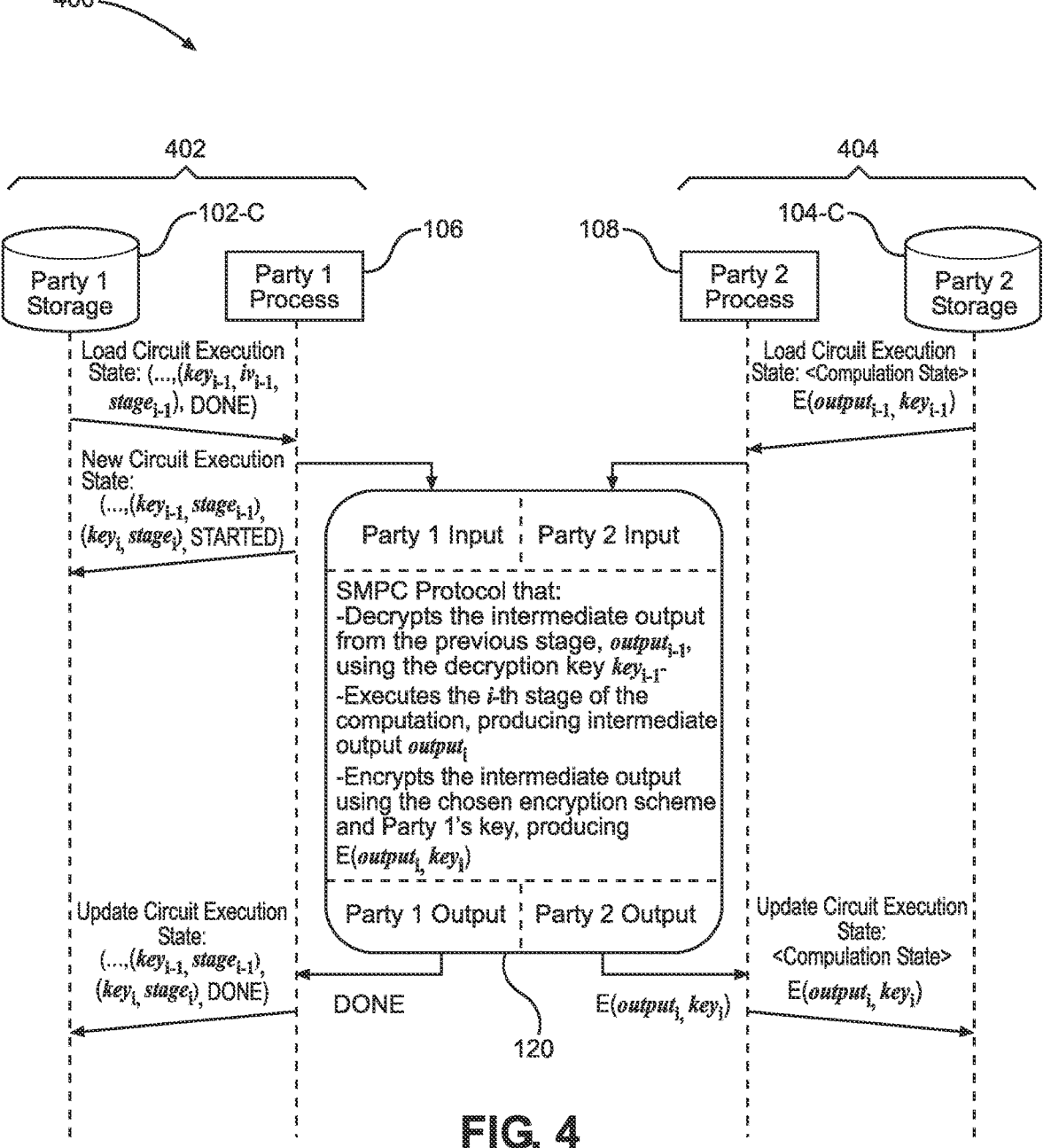

402

104-C

102-C

-106

108-

Party 1 Storage

Party 1 Process

Party 2 Process

Party 2 Storage

Load Circuit Execution State: $(...,(key_{i-1}, iv_{i-1}, stage_{i-1}),$ DONE)

Load Circuit Execution State: <Compulation State> $E(output_{i-1}, key_{i-1})$

New Circuit Execution State: $(...,(key_{i-1}, stage_{i-1}), (key_i, stage_i),$ STARTED)

Party 1 Input | Party 2 Input

SMPC Protocol that:
-Decrypts the intermediate output from the previous stage, $output_{i-1}$, using the decryption key $key_{i-1}$.
-Executes the *i*-th stage of the computation, producing intermediate output $output_i$
-Encrypts the intermediate output using the chosen encryption scheme and Party 1's key, producing $E(output_i, key_i)$ Update Circuit Execution State: $(...,(key_{i-1}, stage_{i-1}), (key_i, stage_i),$ DONE)

Party 1 Output | Party 2 Output

DONE $E(output_i, key_i)$

120

Update Circuit Execution State: <Compulation State> $E(output_i, key_i)$

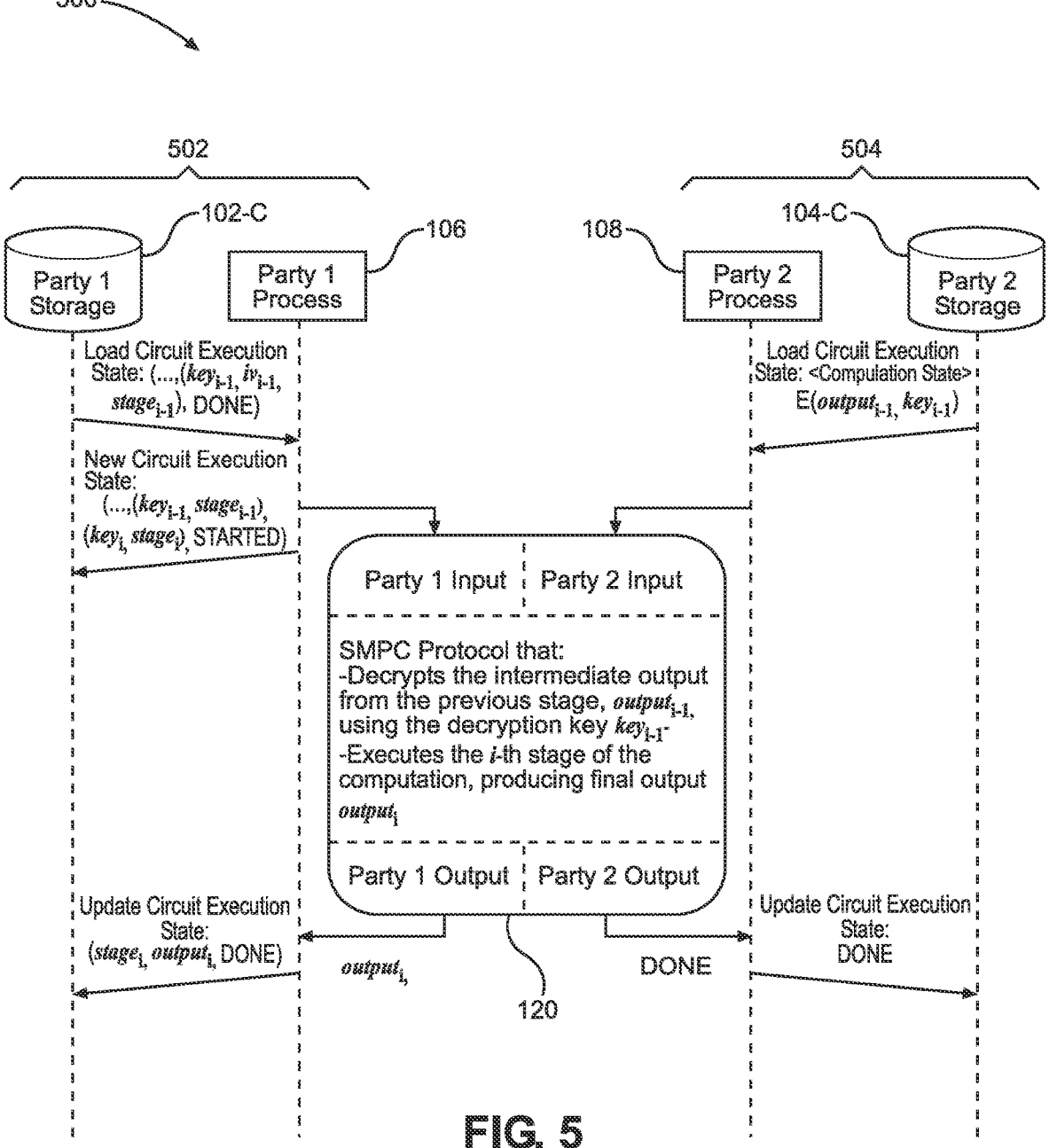

502

—102-C

—106

108—

104-C—

504

Party 1
Storage

Party 1
Process

Party 2
Process

Party 2
Storage

Load Circuit Execution
State: (...,($key_{i-1}$, $iv_{i-1}$,
$stage_{i-1}$), DONE)

Load Circuit Execution
State: <Compulation State>
$E(output_{i-1}, key_{i-1})$

New Circuit Execution
State:
(...,($key_{i-1}$, $stage_{i-1}$),
($key_i$, $stage_i$), STARTED)

Party 1 Input | Party 2 Input

SMPC Protocol that:
-Decrypts the intermediate output
from the previous stage, $output_{i-1}$,
using the decryption key $key_{i-1}$.
-Executes the $i$-th stage of the
computation, producing final output
$output_i$ Party 1 Output | Party 2 Output Update Circuit Execution
State:
($stage_i$, $output_i$, DONE)

$output_i$

120

DONE

Update Circuit Execution
State:
DONE

FIG. 5

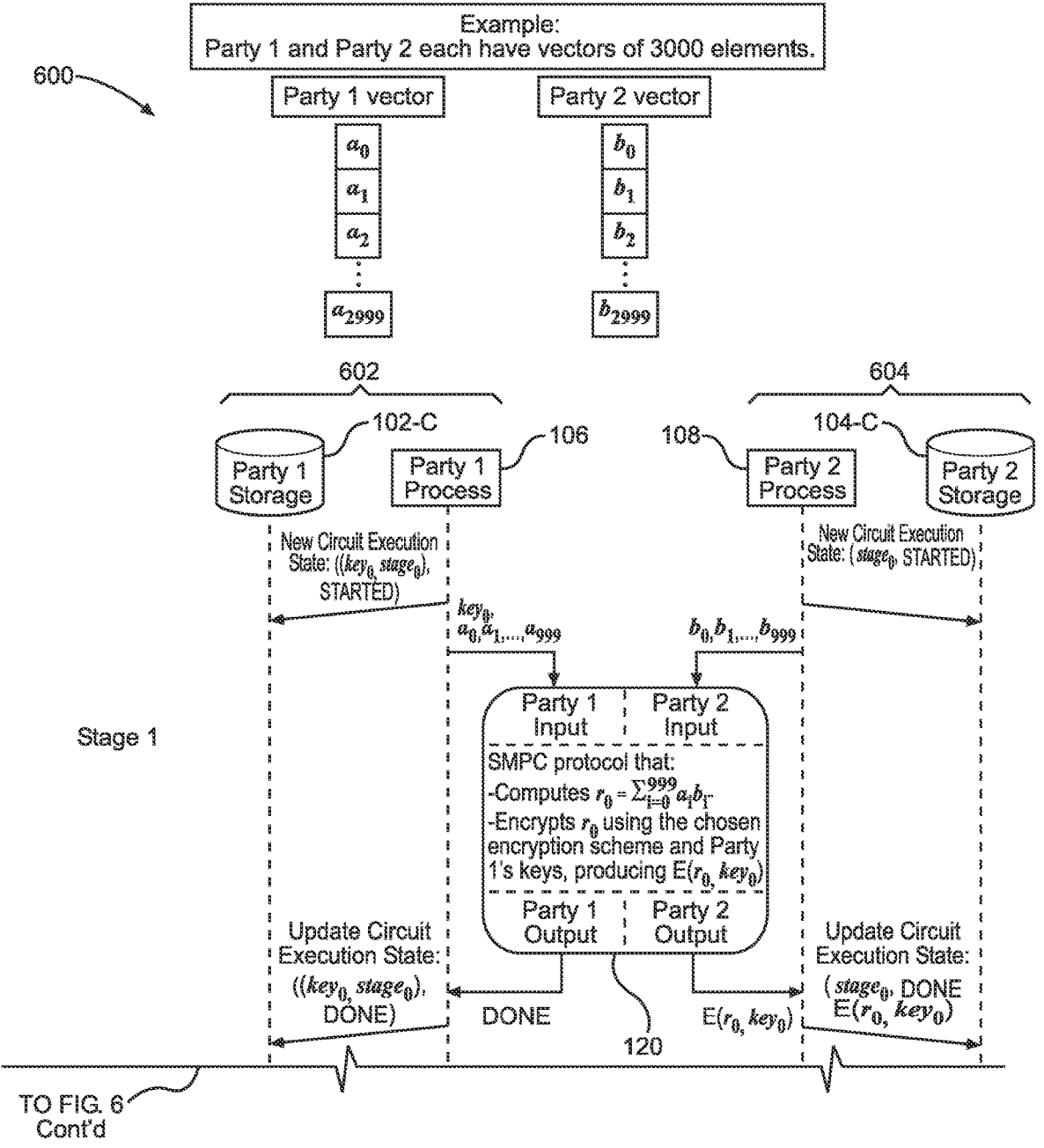

600

Example:
Party 1 and Party 2 each have vectors of 3000 elements.

| Party 1 vector | | Party 2 vector |
| --- | --- | --- |
| $a_0$ | | $b_0$ |
| $a_1$ | | $b_1$ |
| $a_2$ | | $b_2$ |
| ⋮ | | ⋮ |
| $a_{2999}$ | | $b_{2999}$ |

602

604

102-C

106

108

104-C

Party 1 Storage

Party 1 Process

Party 2 Process

Party 2 Storage

New Circuit Execution State: $((key_0, stage_0),$ STARTED)

New Circuit Execution State: $(stage_0,$ STARTED)

$key_0,$
$a_0, a_1, ..., a_{999}$ $b_0, b_1, ..., b_{999}$

Stage 1

Party 1 Input

Party 2 Input

SMPC protocol that:
-Computes $r_0 = \sum_{i=0}^{999} a_i b_i$
-Encrypts $r_0$ using the chosen encryption scheme and Party 1's keys, producing $E(r_0, key_0)$ Party 1 Output Party 2 Output Update Circuit Execution State: $((key_0, stage_0),$ DONE)

DONE $E(r_0, key_0)$

Update Circuit Execution State: $(stage_0,$ DONE $E(r_0, key_0)$

SYSTEMS AND METHODS FOR SECURE MULTI-PARTY COMPUTATION PROTOCOL EXECUTION USING CHECK POINTS

CROSS-REFERENCE TO RELATED APPLICATIONS

N/A.

TECHNICAL FIELD

This disclosure relates to the technical field of encryption, and more specifically, but not by limitation, to encryption used for computer data privacy.

BACKGROUND

Secure Multi-Party Computation (SMPC) protocols are a family of cryptographic protocols that allow two or more participating parties to jointly compute some function depending upon inputs from each party and provide the output of the function to one or more participants. SMPC allows for arbitrary computations on inputs that are provided by each party, while protecting the secrecy of those inputs from all of the other parties who are participating in that computation. At the end of the computation, one party receives the final output of the computation and is not able to see the inputs of the intermediate steps of the computation.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to the technology for secure data processing. Some embodiments of the present disclosure may facilitate the secure execution of a multi-party computation protocol for computing very large functions by creating check points in the computation wherein at each check point the respective parties write out some encrypted data to local persistent storage in such a way that the encrypted data can be used to initiate the next stage of computation between a current check point and the next check point in the computation. If a failure occurs during processing, the previously stored encrypted data can be advantageously used to restart from the check point at which the failure occurred instead of restarting from the beginning of the circuit.

According to one example embodiment of the present disclosure, a method for jointly computing a function in a secure multi-party computation protocol is provided. The method may include establishing a communication link between a first party device and a second party device. The method may further include jointly dividing the function to be computed into a multi-staged function by the first party and second party devices. The method may include jointly choosing an encryption function E by the first party and second party devices. The method may further include jointly constructing a multi-stage SMPC-compatible function, by the first party and second party devices, such that each stage of the multi-stage SMPC compatible function is compatible with a corresponding stage of the multi-staged function. The method may include jointly executing a multi-stage SMPC protocol to jointly compute the multi-stage SMPC compatible function by the first party and second party devices. The method may further include triggering a checkpoint event upon separately determining a failure in the joint computation of the multi-stage SMPC compatible function at a current stage of execution. The method may include restarting the multi-stage SMPC protocol from the current stage of execution in response to the checkpoint event.

According to one example embodiment of the present disclosure, a system for jointly executing a secure multi-party computation protocol using check points is provided. The system may include at least one processor and a memory storing processor-executable codes, wherein the at least one processor can be configured to implement the operations of the above-mentioned method for executing a multi-party computation protocol using check points.

In some embodiments, the SMPC protocol supports different SMPC schemes that support different functions to be computed. The different SMPC schemes may include any SMPC well known to those knowledgeable in the art, including, without limitation, a Yao Garbled Circuits scheme, an Arithmetic Secret Sharing scheme, a Boolean Secret Sharing scheme and an ABY scheme.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

FIG. 3 is a process flow diagram representing a process flow of an executing SMPC protocol with check points at a first stage of execution of an SMPC protocol, according to an example embodiment.

FIG. 4 is a process flow diagram representing a process flow of an executing SMPC protocol with check points at one or more intermediate stages of execution of an SMPC protocol, according to an example embodiment.

FIG. 5 is a process flow diagram representing a process flow of an executing SMPC protocol with check points at a final stage of execution of an SMPC protocol, according to an example embodiment.

DETAILED DESCRIPTION OF EXEMPLARY EMBODIMENTS

Figure 1:
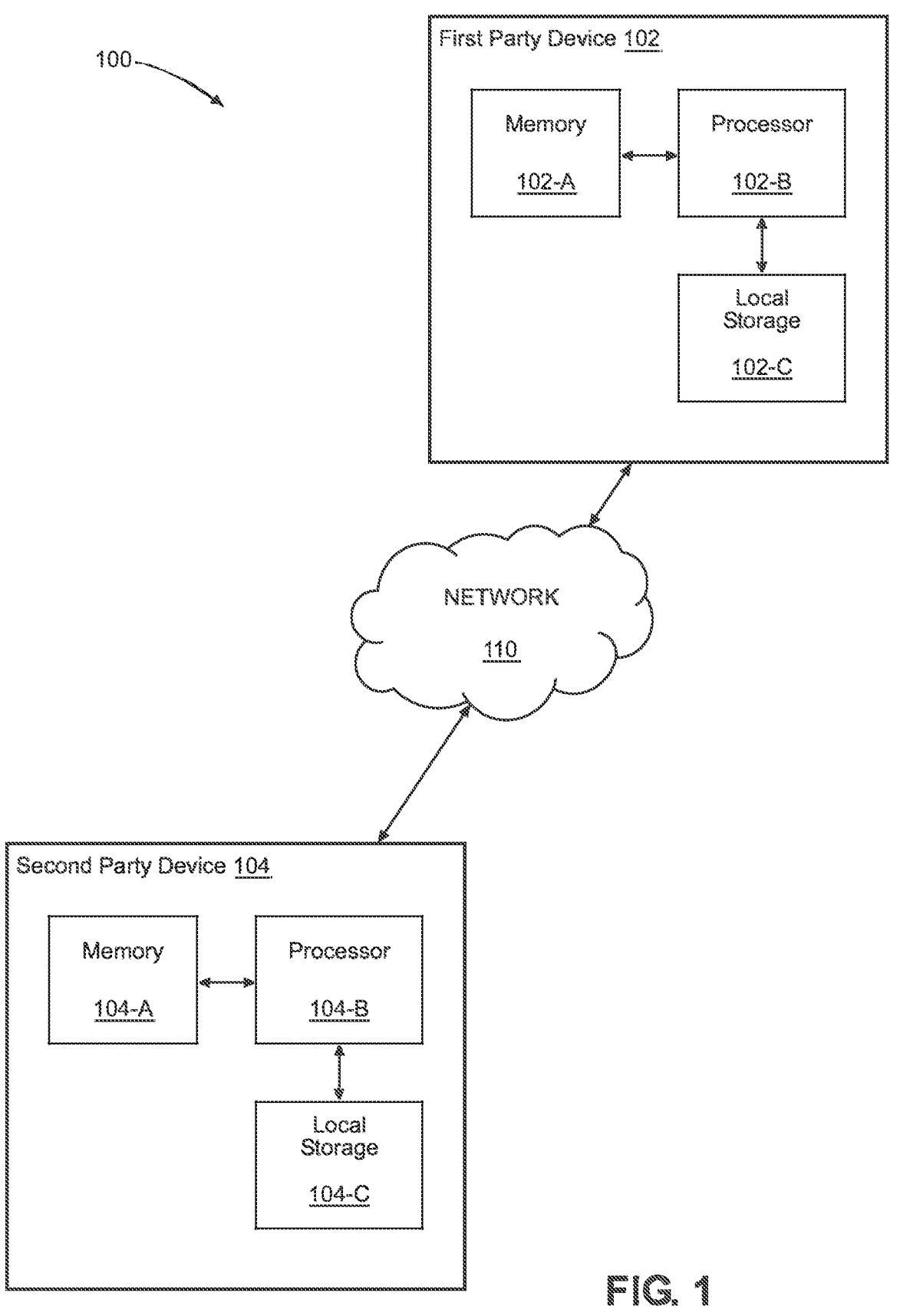
FIG. 1 is a block diagram of an example environment suitable for practicing methods for executing a multi-party computation protocol using check points.
Figure 2:
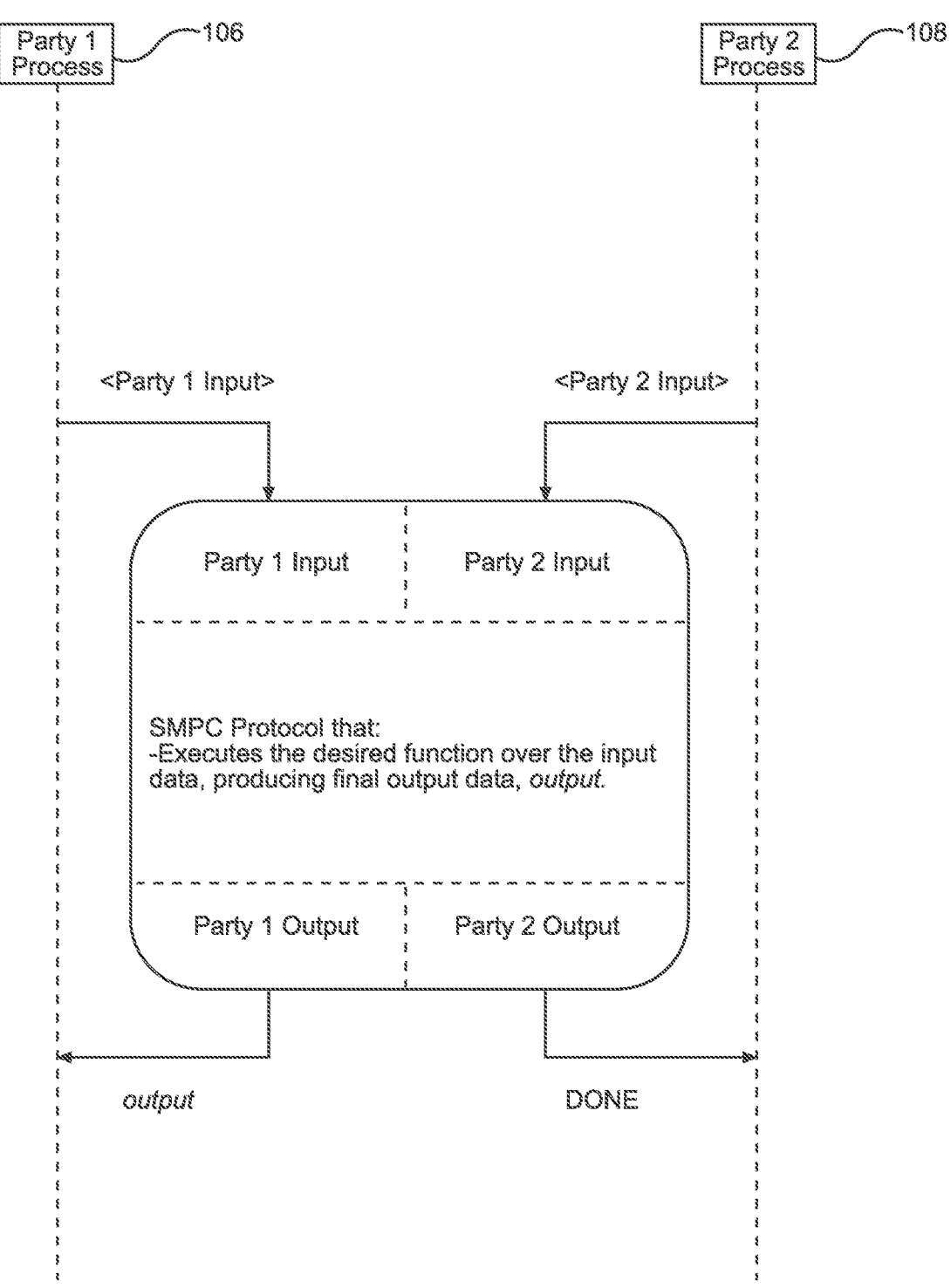
FIG. 2 illustrates a two party SMPC protocol message processing flow without check points according to the prior art.

The technology disclosed herein is concerned with methods and systems for executing a secure multi-party computation protocol (SMPC) using check points. Embodiments of the present disclosure enable the joint computation of a function by two or more participating parties, depending upon inputs from each party, and provide the output of the function to one of the two participants while protecting the inputs of some or all participating parties, such that no other participating party is able to learn anything about the protected inputs. The final output of the jointly computed function is made accessible to only the specific parties agreed to at the start of the SMPC protocol.

Some embodiments of the present disclosure may be used for computing very large functions by creating checkpoints that allow an SMPC protocol to be restarted at some recent state of operation in the event that any party to the computation experiences a failure. By computing the SMPC protocol in stages, where each stage has an associated check point, in the event of a failure, the check point allows the protocol to be restarted from the check point without having to restart the entire protocol. In operation, at each stage of computation of the protocol, one party to the computation receives intermediate computation results encrypted by a key owned by some other party. This encrypted data is saved to local persistent storage, and it and the corresponding key are used to initiate the next stage of computation between a present check point and the next check point. Because no party ever holds both the encrypted intermediate computation results and the corresponding encryption key at the same time, no party is able to decrypt this data and the security of the overall computation is preserved. In the event of a failure, the check point allows the SMPC computation to be restarted from the stage of operation at which the failure occurred by recalling the encrypted data stored in the local persistent storage at the prior check point and re-calculating the function from that checkpoint going forward using the recalled encrypted data and its corresponding key.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 depicts an illustrative architecture 100 suitable for practicing the methods described herein. It should be noted, however, that the architecture 100 is just one example and is a simplified embodiment provided for illustrative purposes, and reasonable deviations of this embodiment are possible as will be evident for those skilled in the art.

As shown in FIG. 1, the architecture 100 may include at least two devices, i.e., a first party device 102 and a second party device 104. The first and second party devices 102, 104 can be any appropriate device having network functionalities allowing the devices to communicate with each other over one or more wired or wireless communications networks, such as network 110. In various embodiments, the first and second party devices 102, 104 include, but are not limited to, a computer (e.g., laptop computer, tablet computer, desktop computer) and a server.

The first party device 102 includes a memory 102-A, a processor 102-B and a local storage 102-C. The second party device 104 includes a memory 104-A, a processor 104-B, and a local storage 104-C. Generally, the first and second party devices 102, 104 are programmed to perform the methods and operations disclosed herein. The network 110 can include any public and/or private network that would be known to one of ordinary skill in the art.

FIGS. 3-5 illustrate process flow diagrams 300-500 at various stages during the execution of a single SMPC protocol for computing a joint function with check points, according to some embodiments. As shown in FIGS. 3-5, the left-hand side 302, 402, 502 of the process flow diagrams 300, 400, 500 illustrate various processes 106 and messages associated with the first party device 102 (See FIG. 1). As also shown in FIGS. 3-5, the right-hand side 304, 404, 504 of the process flow diagrams 300, 400, 500 illustrate various processes 108 and messages associated with the second party device 104 (See FIG. 1).

Also shown in FIGS. 3-5 is an SMPC circuit 120, including at least one processor, configured to receive inputs and provide outputs to/from the first and second party devices 102, 104 for computing a joint function in accordance with a multi-stage SMPC protocol using check points. Of note, the top of the left-hand side 302, 402, 502 of FIGS. 3-5 illustrate messaging sent by the first party device 102 earlier in time to the SMPC circuit 120 in the execution of the SMPC protocol. While the bottom of the left-hand side 302, 402, 502 of FIGS. 3-5 illustrate messaging sent by the first party device 102 later in time to the SMPC circuit 120 in the execution of the SMPC protocol. The time-line messaging is equally applicable to the right-hand side 304, 404, 504 of FIGS. 3-5 with respect to the second party device 104.

The SMPC circuit 120 can include a large number of messages exchanged between the first and second party devices 102, 104. As shown in FIG. 3, the SMPC circuit 120 includes, for ease of explanation, limited text describing some critical operations performed by the SMPC protocol at the various stages of execution of the SMPC protocol. Of note, while the SMPC circuit 120 can itself include a large number of messages exchanged between the first and second parties, these messages are not germane to the present disclosure and have been extracted out from FIGS. 3-5 for ease of explanation. Instead, the messaging shown in FIGS. 3-5 focus primarily on critical messaging sent from the first and second party devices 102, 104 at the beginning and the end of the protocol. Other messaging not explicitly illustrated will be apparent to those knowledgeable in the art.

In operation, the SMPC protocol is executed by an SMPC circuit 120, including at least one processor, in stages. The SMPC circuit is associated with both the Party 1 device and the Party 2 device. The SMPC circuit 120 executes the SMPC protocol in accordance with whatever SMPC scheme has been selected for use in the SMPC protocol. An SMPC scheme selected for use may include, for example, a Yao Garbled Circuits scheme, a Boolean Secret Sharing scheme, and future schemes to be used in the future. Both Party 1 and Party 2 agree to the structure of the SMPC circuit and know what it will be ahead of time. The SMPC circuit is evaluated by a series of cryptographic sub-protocols that correspond to each of the operations in the circuit. Both Party 1 and Party 2 participate in all of the sub-protocols.

According to some embodiments, an SMPC protocol of the present disclosure requires certain modifications to facilitate the use of check points during execution. The modifications may include (1) breaking down a function to be computed into a number of stages, (2) constructing a multi-stage SMPC function that is compatible with the staged function, and (3) selecting an encryption function E. Each of the modifications will be performed prior to executing the multi-stage SMPC protocol.

Breaking Down a Function into Stages

Breaking down a function to be computed into stages prior to executing a multi-stage SMPC protocol with check points enables function inputs used at any stage of execution or before any stage of execution, as well as any values computed by the function on or before any stage, to be marked as intermediate outputs for that stage. The intermediate outputs, at each stage, are stored in a data repository and are available for recall if needed to restart the joint computation in the event of a failure.

Additional benefits of, breaking down a function to be computed into multiple stages for processing by a multi-stage SMPC protocol include (1) minimizing the amount of intermediate outputs carried between stages, (2) functional breakdown keeps the amount of computational work done between stages roughly equal, and (3) all stages are kept sufficiently small so that they are likely to complete before any party to the computation experiences a failure.

Breaking Down an SMPC Protocol into Stages

A benefit of breaking an SMPC protocol into multiple stages is that certain information about the state of the computation can be made available in plaintext to both parties, if desired. This can be useful because the computations performed under SMPC must be oblivious, meaning that the structure of the computation (i.e. which primitive operations are performed) cannot depend on the plaintext value of any input. This prevents normal SMPC algorithms from implementing common performance optimizations, such as terminating a machine learning training loop once convergence has been reached. By passing state information out of the circuit between executions, the parties can choose to condition future function executions on these values, which can allow for such performance improvements. Note that these are still only possible if both parties agree that revealing this information will not expose any private information about their inputs to the protocol.

In some embodiments, breaking the circuit execution of the SMPC protocol into a number of stages allows some stages to be executed in parallel, across multiple processors belonging to both devices.

In accordance with one aspect, a modification to the computation performed according to the SMPC protocol, discussed supra, includes the construction of one function compatible with the SMPC protocol for each stage of the multi-stage function. Because some SMPC protocols only support certain types of operations, it may be necessary to modify each stage of the multi-stage function to only use operations compatible with the chosen SMPC protocol while keeping the overall functionality of the computation the same.

A further modification to the computation of the SMPC protocol includes the selection of an encryption function E. In some embodiments, it is required that the encryption function support encrypting data D given a secret key K to generate a ciphertext $E(k,D)$. In other embodiments, the encryption function E must be compatible with the operations supported by an SMPC scheme selected for use. In still further embodiments, the encryption function E selected for use with the SMPC protocol must also comply with the security requirements for the use case. Of note, in some embodiments, malicious security may be desired for the SMPC protocol. In this case, the encryption function E selected for use must include a method for authenticating that decrypted data has not been altered (e.g., a message authentication code (MAC).

In those embodiments in which malicious security may be desired for the SMPC protocol, it is required to add to a next (ith+1) stage of the SMPC protocol, a validation of the previous (ith) stage's MAC. In addition, a MAC algorithm must be use as part of the encryption as well as adding the MAC to the intermediate outputs provided at each stage. The output state of this validation will need to be added to the intermediate output and carried forward until the end of the algorithm, at which point Party 1 can check that all MACs were valid across all stages. If Party 1 cannot validate that all MACs were valid across all stages, the final output is discarded and the SMPC protocol is declared to have failed. Using MACs in this fashion prevents a malicious Party 2 from tampering with the encrypted intermediate output without detection by Party 1.

Process Flow of SMPC Protocol

FIGS. 3-5 illustrate the process flow of a multi-stage SMPC Protocol of the present disclosure including check points at various stages of execution, according to some embodiments. Specifically, FIG. 3 illustrates the process flow at a first stage of execution of the multi-stage SMPC protocol. FIG. 4 illustrates the process flow at one or more intermediate stages of execution of the multi-stage SMPC protocol. FIG. 5 illustrates the process flow at the final stage of execution of the multi-stage SMPC protocol. Each stage will be described as follows.

FIG. 3 is a process flow diagram 300 pertaining to a first stage of execution of an SMPC protocol for computing a joint function with check points, according to one embodiment.

Referring to FIG. 3, an SMPC circuit 120 executes the first stage of the SMPC protocol. Processes performed by the first party device 102 are generally indicated as 302 on the left-hand side of the process flow diagram and processes generally associated with the second party device 104 are indicated as 304 on the right-hand side of the process flow diagram. Of note, each stage of the SMPC protocol is given an assigned identifier, which is used to tag the encryption keys and encrypted outputs for that stage, in the event that one or both of the encryption keys and encrypted outputs need to be re-loaded from permanent storage.

At the first stage of the multi-stage SMPC protocol (stage: $i=0$), a conventional input protocol is used for whatever SMPC scheme has been selected for use (e.g., Yao Garbled Circuits scheme, Boolean Secret Sharing scheme, etc.). In accordance with the conventional input protocol, the first party device 102 inputs an encryption key $k_0$ to the SMPC circuit 120 shown as part of the party 1 process 106. The second party device 104 does not provide any inputs required by the checkpointing method disclosed to the SMPC circuit 120 at this first stage. However, party 2 may provide other inputs necessary to the multi-stage computation. This is also true at other stages of operation of the SMPC protocol for both party 1 and party 2.

Computation by the SMPC circuit 120 at the first stage comprises computing the output of a first stage of a previously multi-stage SMPC-compatible function $output_0$ that is compatible with the original function to be computed, divided into stages. The SMPC circuit 120 then encrypts the output $output_0$ of the first stage of the multi-stage SMPC-compatible function to produce intermediate output $E(output_0, key_0)$ using the chosen encryption scheme and the first party device 102 encryption key $key_0$ generated at the first stage. The intermediate output $E(output_0, key_0)$ is output to the second party device 104 and stored in a local storage 104-C of the second party device 104.

Both the first and second party devices 102, 104, update the circuit execution state for each stage of operation by separately determining whether the circuit execution state for the current stage has been successfully completed or not.

FIG. 4 is a process flow diagram 400 pertaining to an intermediate stage of execution of an SMPC protocol for computing a joint function with check points.

Referring to FIG. 3, at an intermediate stage of execution of an SMPC protocol, a non-conventional input protocol is used for whatever SMPC scheme has been selected for use (e.g., Yao Garbled Circuits scheme, Boolean Secret Sharing scheme, etc.). In accordance with the non-conventional input protocol, the first party device 102 provides additional inputs to the SMPC circuit 120 as part of the party 1 process 106. These inputs include the circuit execution state from the previous stage and a new encryption key ki generated by the first party device 102 at the ith intermediate stage. These inputs are provided to the SMPC circuit 120 as part of the party 1 process 106. The second party device 104 inputs the circuit execution state saved from the previous stage and the encrypted output from the previous stage from the local data repository 112 as part of the party 2 process 108.

The SMPC circuit 120, at the ith intermediate stage decrypts the previous stage encrypted intermediate output provided by the second party device 104 and executes the ith stage of the computation to produce intermediate output $output_1$. Lastly, SMPC circuit 120 encrypts the intermediate output $output_1$ using the chosen encryption scheme and a new encryption key ki generated by the first party, as part of the party 1 process 106, to produce an ith stage encrypted output, E(output1, key1). The encrypted output E(output1, key1) is provided to the second party device 104 as part of the party 2 process 108. Lastly, both the first and second party devices update the circuit execution state pertaining to whether or not the stage has been successfully completed.

FIG. 5 is a process flow diagram 500 pertaining to a final stage of execution of an SMPC protocol for computing a joint function with check points.

Referring to FIG. 5, at a final stage of execution of an SMPC protocol, a non-conventional input protocol is used for whatever SMPC scheme has been selected for use (e.g., Yao Garbled Circuits scheme, Boolean Secret Sharing scheme, etc.). In accordance with the non-conventional input protocol, the first party device 102 provides an additional input to the SMPC circuit 120 as part of the party 1 process 106. This input comprises the circuit execution state from the previous stage. The second party device 104 inputs the circuit execution state saved from the previous stage and the encrypted output from the previous stage $E(output_{i-1}, key_{i-1})$ from the local data repository 112 as part of the party 2 process 108.

The SMPC circuit 120, at the final stage decrypts the previous stage encrypted intermediate output from the previous stage $output_{i-1}$, provided by the second party device 104 and executes the final stage of the computation to produce final output $output_N$. Lastly, both the first and second party devices update the circuit execution state pertaining to whether or not the stage has been successfully completed.

EXAMPLE

Figure 6:
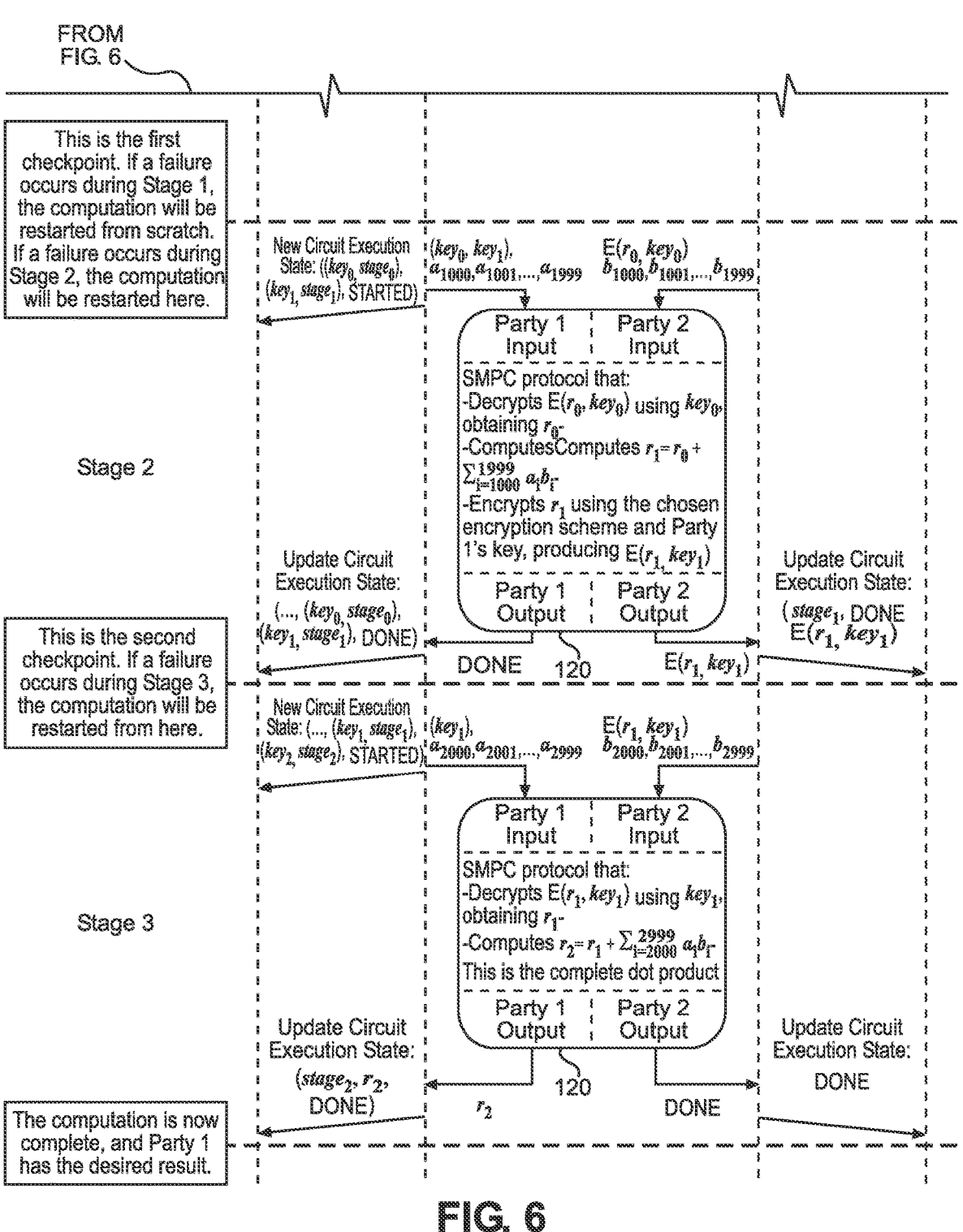
FIG. 6 is a simplified example of a two party SMPC protocol message processing flow with check points according to an example embodiment.

With reference now to FIG. 6, a non-limiting example is provided of a system and method 600 for computing a dot product of vectors using a secure multi-party computation (SMPC) protocol with check points, according to some embodiments.

As shown in FIG. 6, a first party and a second party agree to perform a joint computation using an SMPC protocol to compute a dot product of party 1's vector A with party 2's vector B, where Vectors A and B are of equal size, i.e., 3000 elements. Processes performed by the first party are generally indicated on the left-hand side 602 of the process flow diagram and processes generally associated with the second party are indicated as 604 on the right-hand side of the process flow diagram. The first party and second party agree to provide the final output of the computation to only the first party, without revealing the content of their respective input vectors A and B to each other to ensure data security.

The dot product for vectors A and B may be computed as:

$$\text{Dot product} = \sum a_i, b_i \quad \text{(Eq. 1)}$$
$$\text{for } i = 0 \text{ to } 2999$$

A preliminary step towards carrying out the dot product computation using a multi-stage SMPC protocol with check points is to first divide the dot product function into stages. In the present example, the dot product function is divided into three stages with 1000 elements being computed at each stage. In accordance with a method embodiment, at the end of each of the first and second stages, a check point will be created. In the event a failure is detected by both parties during either of the first and second stages, the computation may be restarted from that check point thereby obviating the need to re-start the entire computation from scratch.

The process flow for stages 1 through 3 is described as follows.

FIG. 6 illustrates a process flow diagram for using a multi-stage SMPC protocol of the present disclosure to compute the dot product of two vectors A and B of equivalent size 3000. Where one of the two vectors (Vector A) is associated with Party 1 and the other of the two vectors (Vector B) is associated with Party 2. At each stage of the three stage SMPC protocol, a running total is maintained of the dot product to be carried forward to a final stage, as will be described below.

<<Stage 1 of the 3 Stage SMPC Protocol for Computing a Dot Product of Vectors>>

Beginning of Stage 1

At the beginning of stage 1 of the SMPC protocol, the first party to the joint computation (party 1) generates and provides an encryption key $key_0$, to the SMPC circuit 120. The first party (party 1) also inputs the first 1000 elements of a vector A-1=$a_0$, $a_2$, . . . , $a_{999}$ of the first party's 3000 element vector A, shown in FIG. 6.

At the beginning of stage 1 of the SMPC protocol, the second party to the joint computation (party 2) inputs the first 1000 elements of a vector B-1=$b_0$, $b_1$, . . . , $b_{999}$. of the second party's 3000 element vector B, shown in FIG. 6.

Stage 1 Operations Performed by the SMPC Circuit

At the first stage, the SMPC circuit 120 computes a running total of the dot product computation for the first 1000 elements for each of vectors A and B, computed as:

$$R_0 = \sum a_i, b_i \quad \text{(Eq. 2)}$$
$$\text{for } i = 0 \text{ to } 999$$

At the first stage, the SMPC circuit 120 then encrypts the running total $R_0$ of the dot product, shown in equation (2) using a chosen encryption scheme and the encryption key $key_0$ generated by the first party (party 1) at this stage, computed as:

$$E(R_0, key0) \quad \text{(Eq. 3)}$$

End of Stage 1

At the end of stage 1, the first party to the joint computation (party 1) updates the circuit execution state for the present stage. Similarly, the second party to the joint computation (party 2) updates the circuit execution state for the present state. In addition, the second party (party 2) also saves the encrypted dot product running total E ($R_0$, $key_0$) computed at this stage to a local permanent storage associated with the second party.

First Stage Checkpoint

The end of the first stage is synonymous with the first stage checkpoint. That is, if it is determined at the end of the first stage, from the circuit execution state value, that a failure has occurred, the computation will be restarted from the beginning without saving any prior results. Alternatively, if a failure occurs during the second stage, the computation will be restarted from the end of stage 1 by a process of recalling saved intermediate values saved at the end of stage 1, and re-starting from that point.

<<Stage 2 of the 3 Stage SMPC Protocol for Computing a Dot Product of Vectors>>

Beginning of Stage 2

At the beginning of the second stage (Stage 2) of computation, the second party (party 2) provides to the SMPC circuit 120, the previously stored encrypted running total E ($R_0$, $key_0$) from the second party's permanent local storage. The first party (Party 1) provides to the SMPC circuit 120, the previously stored key $key_0$ from the first party's permanent local storage. The first party (Party 1) also generates a new encryption key $key1$ to be provided as an input to the SMPC circuit 120.

Stage 2 Operations Performed by the SMPC Circuit

At stage 2, the operations performed by the SMPC circuit 120 at the present stage (stage 2) include removing the encryption from the running total E ($R_0$, $key0$) provided by Party 2 as an input to the circuit to yield a decrypted running total Roof the first 1000 elements of Vectors A and B. The decrypted value $R_0$ allows the SMPC circuit to continue to update and encrypt the dot product running total at the present stage (stage 2) for the first 2000 elements of the Party 1 and Party 2 vectors, wherein the decrypted running total for the first 2000 elements is computed as:

$$R_1 = R_0 + \sum a_i, b_i \qquad \text{(Eq. 4)}$$

$$\text{for } i = 1000 \text{ to } 1999$$

The operations further include at the second stage, encrypting the dot product running total $R_1$ is using the new encryption key $key_1$ generated by Party 1 at this stage (stage 2), computed as:

$$E(R_1, key1) \qquad \text{(Eq. 5)}$$

End of Stage 2

At the end of stage 2, the first party to the joint computation (party 1) updates the circuit execution state for the present stage. Similarly, the second party to the joint computation (party 2) updates the circuit execution state at the present stage. In addition, the second party (party 2) also saves the encrypted dot product running total E ($R_1$, $key1$) computed at this stage to a local permanent storage associated with the second party.

Second Stage Checkpoint

The end of the second stage is synonymous with the second stage checkpoint. That is, if it is determined at the end of the second stage, from a review of the circuit execution state stored at the previous stage, that a failure has occurred, the SMPC computation will be restarted from the checkpoint.

<<Stage 3 of the 3 Stage SMPC Protocol for Computing a Dot Product of Vectors>>

Beginning of Stage 3

At the beginning of stage 3 of the SMPC protocol, the first party to the joint computation (party 1) provides the previously stored key $key1$ from the first party's permanent local storage, to the SMPC circuit 120. The second party to the joint computation (party 2), provides to the SMPC circuit 120 the previously stored encrypted running total E (R1, key1) from the prior stage (stage 2) from the second party's permanent local storage.

Stage 3 Operations Performed by the SMPC Circuit

At the third and final stage of the SMPC protocol, the SMPC circuit 120 decrypts the previously stored encrypted running total E (R1, key1) from the second party's permanent local storage to yield decrypted running total R1.

The SMPC circuit computes the complete dot product computation for all the first 1000 elements for each of vectors A and B, using the previously determined $R_1$ and $R_2$ values, computed as:

$$\text{Complete dot product } R2 = R1 + \sum a_i, b_i \qquad \text{(Eq. 2)}$$

$$\text{for } i = 2000 \text{ to } 2999$$

The computation is considered complete at this point.

End of Stage 3

At the end of stage 3, the complete dot product result is output to the first party (party 1). The first party to the joint computation (party 1) then updates the circuit execution state. The second party to the joint computation (party 2) updates the circuit execution state.

Figure 7:
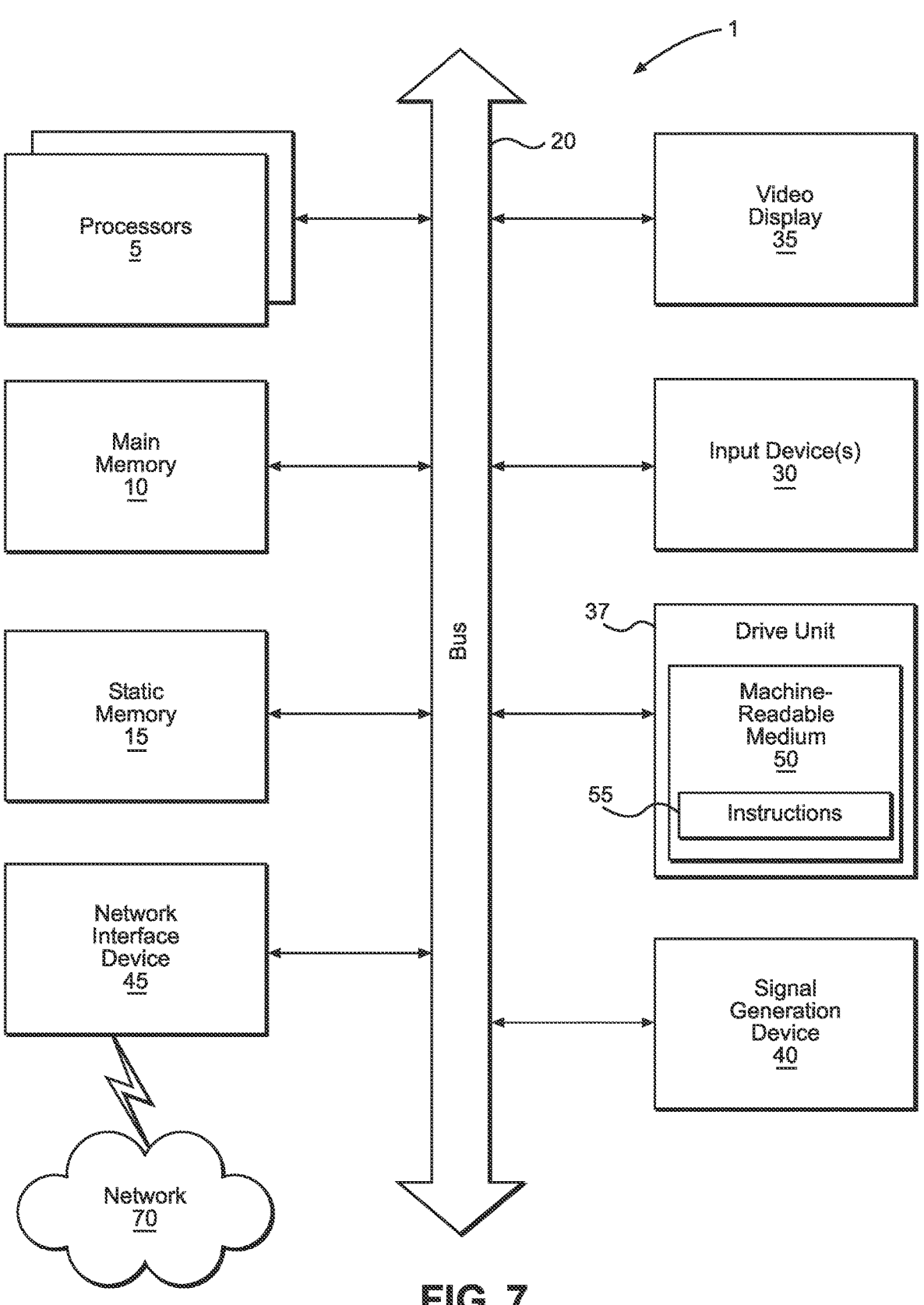
FIG. 7 is a computer system that can be used to implement various embodiments of the present disclosure.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or bio-metric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodolo-gies or functions described herein. The instructions 55 may also reside, completely or at least partially, within the main memory 10 and/or within the processor(s) 5 during execu-tion thereof by the computer system 1. The main memory 10 and the processor(s) 5 may also constitute machine-readable media.

The instructions 55 may further be transmitted or received over a network 70 via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising soft-ware installed on a computer, in hardware, or in a combi-nation of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., com-puter-readable medium). The instructions may be retrieved and executed by the processor. Some examples of storage media are memory devices, tapes, disks, and the like. The instructions are operational when executed by the processor to direct the processor to operate in accord with the tech-nology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infra-structure to obtain the benefit of large computational or storage resources.

The cloud is formed, for example, by a network of web servers that comprise a plurality of devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method comprising:
   a) establishing a communication link between a first party device and a second party device;
   b) jointly dividing a function to be computed into a multi-staged function by the first party device and the second party device;
   c) jointly choosing an encryption function E by the first party and second party devices;
   d) jointly constructing a multi-stage Secure Multi-Party Computation (SMPC)-compatible function, by the first party device and the second party device, such that each stage of the multi-stage SMPC-compatible function is compatible with a corresponding stage of the multi-staged function;
   e) jointly executing a multi-stage SMPC protocol to jointly compute the multi-stage SMPC-compatible function by the first party device and the second party device;
   f) triggering a checkpoint event upon separately determining a failure in the joint computation of the multi-stage SMPC-compatible function at a current stage of execution; and
   g) restarting the multi-stage SMPC protocol from the current stage of execution in response to the checkpoint event.

2. The method of claim 1, wherein executing the multi-stage SMPC protocol to jointly compute the multi-stage SMPC-compatible function by the first party device and the second party device, at a first stage of the multi-stage SMPC protocol comprises:
   generating an encryption key $k_0$, by the first party device;
   jointly computing an encrypted output $Out_0$ of the first stage of the multi-stage SMPC protocol, using a first stage of the multi-stage SMPC-compatible function and the generated encryption key ko as inputs to the computation;
   receiving, by the second party device, the encrypted output $Out_0$;
   saving, by the second party device, the encrypted output $Out_0$ to a local storage of the second party device;
   saving, by the first party device, the encryption key $k_0$, to a local storage of the first party device;
   saving a current state of circuit execution to the local storage of the first party device; and
   saving the current state of circuit execution to the local storage of the second party device.

3. The method of claim 1, wherein executing the multi-stage SMPC protocol to jointly compute the multi-stage SMPC-compatible function by the first party device and the second party device at one or more intermediate stages in between a first stage and a final stage comprises:
   loading, by the second party device, an encrypted output $Out_{i-1}$ from a local storage of the second party device;
   generating an encryption key $k_i$, by the first party device;
   loading, by the first party device, an encryption key $k_{i-1}$ from a local storage of the first party device;

jointly decrypting the encrypted output $Out_{i-1}$ loaded from the local storage of the second party device, using the encryption key $k_{i-1}$ loaded from the local storage of the first party device to generate plaintext intermediate data from a prior intermediate stage;

jointly computing, by the first party device and the second party device, a current encrypted intermediate stage output $Out_i$, using a current stage of the multi-stage SMPC-compatible function, the generated plaintext intermediate data and the generated encryption key $k_i$;

receiving, by the second party device, the encrypted output $Out_i$, saving, by the second party device, the encrypted output $Out_i$, provided by the first party device, to the local storage of the second party device;

saving, by the first party device, the encryption key $k_i$, to the local storage of the first party device; and saving a parameter to the local storage of the first party device and the second party device indicating a current state of circuit execution completion.

4. The method of claim 1, wherein executing the multi-stage SMPC protocol to jointly compute the multi-stage SMPC-compatible function by the first party device and the second party device at a final stage comprises:

loading, by the second party device, an encrypted output $Out_{i-1}$ from a local storage of the second party device;

loading, by the first party device, an encryption key $k_{i-1}$ from a local storage of the first party device;

jointly decrypting the encrypted output $Out_{i-1}$ loaded from the local storage of the second party device, using the encryption key $k_{i-1}$ loaded from the local storage of the first party device to generate a decrypted output; and receiving, by the first party device, the decrypted output.

5. The method of claim 1, further comprising, upon triggering the checkpoint event;

re-establishing a communication link between the first party device and the second party device prior to restarting the multi-stage SMPC protocol; and obtaining a joint agreement between the first party device and the second party device over the re-established communication link to restart the multi-stage SMPC protocol prior to restarting the multi-stage SMPC protocol from the current stage of execution in response to the checkpoint event.

6. The method of claim 1, wherein the chosen encryption function E is based on a pre-determined encryption algorithm compatible with the multi-stage SMPC protocol.

7. The method of claim 1, wherein a message authentication code (MAC) algorithm is incorporated as part of a pre-determined encryption algorithm.

8. The method of claim 7, wherein the MAC algorithm is added to an output of each stage of the multi-stage SMPC protocol.

9. The method of claim 8, wherein a validation of the MAC algorithm is added to the output of each stage of the multi-stage SMPC protocol.

10. The method of claim 1, wherein the function to be computed is jointly divided into the multi-staged function to minimize an amount of intermediate outputs carried between stages.

11. A system comprising:

a memory; and a processor communicatively coupled to the memory, the memory storing instructions executable by the processor to:

a) establish a communication link between a first party device and a second party device;

b) jointly divide a function to be computed into a multi-staged function by the first party device and the second party device;

c) jointly choose an encryption function E by the first party and second party devices;

d) jointly construct a multi-stage Secure Multi-Party Computation (SMPC)-compatible function, by the first party device and the second party device, such that each stage of the multi-stage SMPC-compatible function is compatible with a corresponding stage of the multi-staged function;

e) jointly execute a multi-stage SMPC protocol to jointly compute the multi-stage SMPC-compatible function by the first party device and the second party device;

f) trigger a checkpoint event upon separately determining a failure in the joint computation of the multi-stage SMPC-compatible function at a current stage of execution; and g) restart the multi-stage SMPC protocol from the current stage of execution in response to the checkpoint event.

12. The system of claim 11, wherein the processor, at a first stage of computation of the multi-stage SMPC protocol, is configured to:

generate an encryption key $k_0$, by the first party device;

jointly compute an encrypted output $Out_0$ of the first stage of the multi-stage SMPC protocol, using a first stage of the multi-stage SMPC-compatible function and the generated encryption key $k_0$ as inputs to the computation;

receive, by the second party device, the encrypted output $Out_0$;

save, by the second party device, the encrypted output $Out_0$ to a local storage of the second party device;

save, by the first party device, the encryption key $k_0$, to a local storage of the first party device;

save a current state of circuit execution to the local storage of the first party device; and save the current state of circuit execution to the local storage of the second party device.

13. The system of claim 11, wherein the processor, at an intermediate stage of operation of the multi-stage SMPC protocol, is configured to:

load, by the second party device, an encrypted output $Out_{i-1}$ from a local storage of the second party device;

generate an encryption key $k_i$, by the first party device;

load, by the first party device, an encryption key $k_{i-1}$ from a local storage of the first party device;

jointly decrypt the encrypted output $Out_{i-1}$ loaded from the local storage of the second party device, using the encryption key $k_{i-1}$ loaded from a local storage of the first party device to generate plaintext intermediate data from a prior intermediate stage;

jointly compute, by the first party device and the second device, a current encrypted intermediate stage output $Out_i$, using a current stage of the multi-stage SMPC-compatible function, the generated plaintext intermediate data and the generated encryption key $k_i$, receive, by the second party device, the encrypted output $Out_i$;

save, by the second party device, the encrypted output $Out_i$, provided by the first party device, to the local storage of the second party device;

save, by the first party device, the encryption key $k_i$, to the local storage of the first party device; and save a parameter to the local storage of the first party device and the second party device indicating a current state of circuit execution completion.

14. The system of claim 11, wherein the processor, at a final stage of operation of the multi-stage SMPC protocol, is configured to:

load, by the second party device, an encrypted output $Out_{i-1}$ from a local storage of the second party device;

load, by the first party device, an encryption key $k_{i-1}$ from a local storage of the first party device;

jointly decrypt the encrypted output $Out_{i-1}$ loaded from the local storage of the second party device, using the encryption key $k_{i-1}$ loaded from the local storage of the first party device to generate a decrypted output; and receive, by the first party device, the decrypted output.

15. The system of claim 11, wherein upon triggering the checkpoint event, the processor is configured to:

re-establish a communication link between the first party device and the second party device prior to restarting the multi-stage SMPC protocol; and obtain a joint agreement between the first party device and the second party device over the re-established communication link to restart the multi-stage SMPC protocol prior to restarting the multi-stage SMPC protocol from the current stage of execution in response to the checkpoint event.

16. The system of claim 11, wherein the chosen encryption function E is based on a pre-determined encryption algorithm compatible with the multi-stage SMPC protocol.

17. The system of claim 11, wherein a message authentication code (MAC) algorithm is incorporated as part of a pre-determined encryption algorithm.

18. The system of claim 17, wherein the MAC algorithm is added to an output of each stage of the multi-stage SMPC protocol.

19. The system of claim 18, wherein a validation of the MAC algorithm is added to the output of each stage of the multi-stage SMPC protocol.

20. The system of claim 11, wherein the function to be computed is jointly divided into the multi-staged function to minimize an amount of intermediate outputs carried between stages.

\* \* \* \* \*